(12) United States Patent
Ma et al.

(10) Patent No.: US 11,822,936 B2
(45) Date of Patent: Nov. 21, 2023

(54) DISPLAY DEVICE AND DISPLAY METHOD THEREOF

(71) Applicant: BOE Technology Group Co., Ltd., Beijing (CN)

(72) Inventors: Xitong Ma, Beijing (CN); Xiaodong Shi, Beijing (CN); Lihua Geng, Beijing (CN); Xingxing Lu, Beijing (CN); Xiao Su, Beijing (CN); Congrui Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 226 days.

(21) Appl. No.: 17/535,165

(22) Filed: Nov. 24, 2021

(65) Prior Publication Data
US 2022/0237001 A1    Jul. 28, 2022

(30) Foreign Application Priority Data
Jan. 22, 2021    (CN) .......................... 202110089098.2

(51) Int. Cl.
*G06F 9/00* (2006.01)
*G06F 9/445* (2018.01)
*G09G 3/20* (2006.01)
*G09G 3/34* (2006.01)

(52) U.S. Cl.
CPC ....... *G06F 9/44505* (2013.01); *G09G 3/2096* (2013.01); *G09G 3/3406* (2013.01); *G09G 2320/0626* (2013.01); *G09G 2360/06* (2013.01)

(58) Field of Classification Search
None
See application file for complete search history.

(56) References Cited

U.S. PATENT DOCUMENTS

| 7,721,118 B1 * | 5/2010 | Tamasi .................. G06F 1/3203 345/546 |
| 9,064,322 B1 * | 6/2015 | Wyatt ....................... G06T 1/20 |
| 2008/0204460 A1 * | 8/2008 | Marinkovic .......... G06F 1/3203 345/502 |

* cited by examiner

*Primary Examiner* — Nitin C Patel
(74) *Attorney, Agent, or Firm* — IPro, PLLC (57) ABSTRACT

A display device includes a first processor, a second processor, and a display module. The first processor is configured to: acquire version information of the second processor upon completion of startup of the second processor; determine version information of the corresponding first processor based on version information of the second processor; load a second configuration file corresponding to the version information of the first processor to output a second display screen associated with the second configuration file to the display module. The display module is configured to display the second display screen.

20 Claims, 4 Drawing Sheets

DISPLAY DEVICE AND DISPLAY METHOD THEREOF

CROSS-REFERENCE TO RELATED APPLICATION

This application is based on and claims priority to the Chinese Patent Application No. 2020110089098.2, filed on Jan. 26, 2021 and entitled "DISPLAY PANEL AND DISPLAY METHOD THEREOF," the disclosure of which is herein incorporated by reference in its entirety.

TECHNICAL FIELD

The present disclosure relates to the field of display technologies, and more particularly, to a display device and a display method thereof.

BACKGROUND

For a display device with two processors, control instructions are typically sent from one processor to the other processor and the execution of specific actions is completed by the other processor.

SUMMARY

Embodiments of the present disclosure provide a display device and a display method thereof.

In a first aspect of the embodiments of the present disclosure, a display device is provided. The display device includes a first processor, a second processor, and a display module; wherein the first processor is both electrically coupled to the second processor and the display module. The first processor is configured to acquire version information of the second processor upon completion of startup of the second processor; determine version information of the first processor corresponding to the second processor based on the version information of the second processor; and load a second configuration file corresponding to the version information of the first processor to output a second display screen associated with the second configuration file to the display module. The display module is configured to display the second display screen.

In a second aspect of the embodiments of the present disclosure, a display method for a display device is provided. The display device includes a first processor, a second processor, and a display module; wherein the first processor is both electrically coupled to the second processor and the display module. The method includes: acquiring version information of the second processor upon completion of startup of the second processor by the first processor; determining version information of the first processor corresponding to the second processor based on the version information of the second processor by the first processor; and loading a second configuration file corresponding to the version information of the first processor to display a second display screen associated with the second configuration file by the display module.

BRIEF DESCRIPTION OF THE DRAWINGS

For clearer descriptions of the technical solutions of the present disclosure or the related art, the following will briefly introduce the drawings that are used to describe the embodiments or the related art. Apparently, the accompanying drawings in the following description only show some embodiments of the present disclosure, and those of ordinary skilled in the art can still derive other drawings from these accompanying drawings without any creative efforts.

DETAILED DESCRIPTION

For clearer descriptions of the objectives, technical solutions, and advantages of the present disclosure, the present disclosure will be further described in detail below in conjunction with specific embodiments and with reference to the accompanying drawings.

It should be noted that, unless otherwise defined, the technical or scientific terms used in the present disclosure should be given the ordinary meanings as understood by those with ordinary skill in the art to which this disclosure belongs. The terms "first," "second," and the like used in the present disclosure do not indicate any order, quantity or importance, but are only used to distinguish different components. The terms "include," "comprise," and variations thereof mean that the element or item appearing in front of the word covers the element or item listed behind the word and its equivalents, but does not exclude other elements or items. The terms "coupled," "connected," and the like are not to be limited to physical or mechanical connections, but can include electrical connections, whether direct or indirect.

Figure 1:
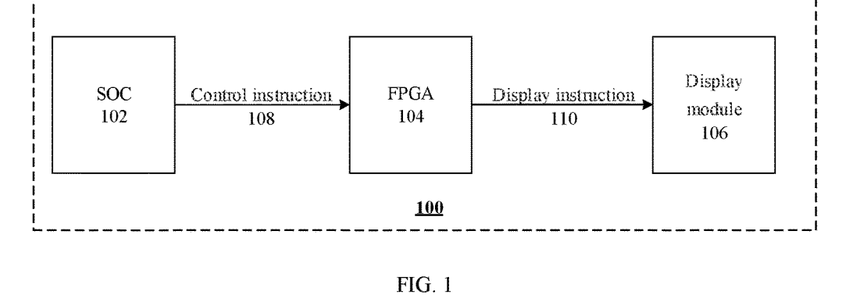
FIG. 1 illustrates a schematic structural diagram of an exemplary display device.

FIG. 1 illustrates a schematic structural diagram of an exemplary display device 100. As shown in FIG. 1, the display device 100 includes a system-on-chip (SoC) 102, a field-programmable gate array (FPGA) 104, and a display module 106.

The display device 100 may be various types of devices with display functions. For example, the display device 100 may be a monitor. In some embodiments, the monitor is a high order monitor. For example, a high definition monitor (generally with a resolution of 4K) or an ultra-high definition monitor (generally with a resolution of 8K).

A high order monitor is typically provided with an architecture of an FPGA plus an SoC. The SoC is configured to control a system and the FPGA is configured to carry out high-speed signal processing and connected to a timing controller (TCON). The SoC 102 may issue a control instruction 108 to the FPGA 104, and the FPGA 104 may generate a corresponding display instruction 110 based on the control instruction 108 and send the display instruction 110 to the display module 106.

Such monitor control architecture may cause some problems in actual use.

For example, both the FPGA and the SoC need to be upgraded remotely, and the version of the FPGA corresponds to the version of the SoC. For example, both the FPGA and the SoC act as two independent processors, the SoC generates an on-screen display (OSD) screen, transmits the screen to the FPGA, and controls the FPGA to operate in accordance with the existing logic of the OSD. A series of register spaces is present in the SoC, and a series of register spaces is also present in the FPGA. The entire system is capable of normally operating only in the case that the register spaces inside the SoC corresponds to the register spaces inside the FPGA. Since only the register spaces inside the SoC correspond to the register spaces inside the FPGA only in the case that the version of the SoC corresponds to the version of the FPGA, a problem of version correspondence between the SoC and the FPGA may be present. In addition, corresponding to different versions of applications (APP) running on the monitor, a requirement for version rollback is imposed.

For another example, compared with the FPGA, the SoC has a longer startup time, resulting in a longer time from booting to lighting of the screen, which affects the user experience.

In view of this, an embodiment of the present disclosure provides a display device. The display device includes a first processor, a second processor, and a display module; wherein the first processor is configured to acquire startup instructions; in response to the startup instruction of first processor in the startup instructions, the startup is completed upon elapse of the first time period, and the first configuration file associated with the first display screen is loaded to output the first display screen to the display module; a second processor is electrically coupled to the first processor and is configured to: in response to a startup instruction of the second processor in the startup instructions, complete startup upon elapse of a second time period and send the version information of the second processor to the first processor; wherein compared to the first time period, the second time period is longer; the first processor is further configured to: determine the version information of the first processor corresponding to the second processor upon receiving the version information of the second processor; determine the second configuration file corresponding to the first processor associated with the second display screen based on the version information of the first processor; load the second configuration file to output a second display screen to the display module upon receiving the load instruction of second configuration file of the second processor; and a display module is electrically coupled to the first processor and configured to display the first display screen or the second display screen.

Embodiments of the present disclosure provide a display device. Since the startup time of second processor is longer, the configuration file is loaded for two separate times by the first processor with a shorter startup time. In the first loading, the first processor loads the configuration file, displays the first display screen, and acquires the version information of the second processor upon completion of startup of the second processor. In the second loading, the first processor loads the configuration file of the first processor that corresponds to the version information and displays the second display screen. In this way, since the time from starting the device to displaying the first display screen is relatively short, an impression that the screen startup time is shortened is given to the user, and the user experience is improved. Meanwhile, during the second loading, the first processor ensures the version consistency with the second processor, and ensures the version correspondence between the first processor and the second processor.

The present disclosure also provides a display device. The display device includes a first processor, a second processor, and a display module, the first processor being both electrically coupled to the second processor and the display module. The first processor is configured to acquire the version information of the second processor upon completion of startup of the second processor, determine the version information of the first processor corresponding to the second processor based on the version information of the second processor, load a second configuration file corresponding to the version information of the first processor to output a second display screen associated with the second configuration file to the display module; and wherein the display module is configured to display the second display screen.

The first processor acquires the version information of the second processor upon completion of startup of the second processor, loads a second configuration file of the first processor corresponding to the version information, and displays a second display screen. As such, the first processor guarantees the version consistency with the second processor, and ensures the version correspondence between the first processor and the second processor.

In some embodiments, the first processor is further configured to load a first configuration file to output a first display screen associated with the first configuration file to the display module upon completion of a startup; the display module is further configured to display the first display screen; wherein the time of completion of startup of the first processor is earlier than the time of completion of startup of the second processor.

The first configuration file is loaded by the first processor with a shorter startup time, such that the display module displays the first display screen associated with the first configuration file. In this way, the time from starting the device to displaying the first display screen is shorter. This gives an impression that the screen startup time is shortened, and the user experience is improved.

Figure 2:
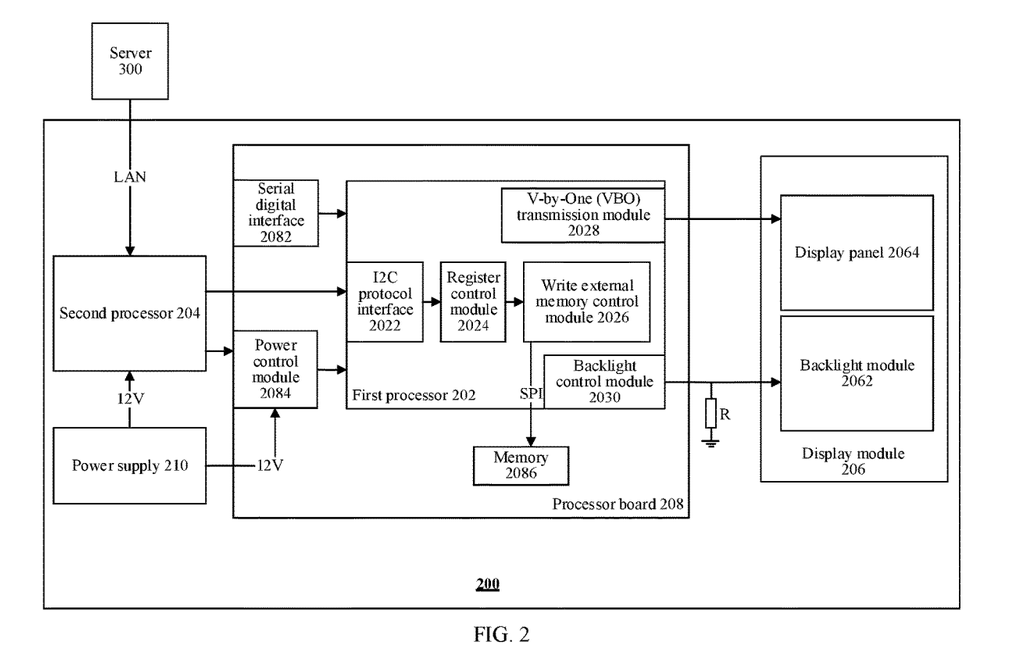
FIG. 2 illustrates a schematic structural diagram of an exemplary display device according to an embodiment of the present disclosure.

FIG. 2 illustrates a schematic structural diagram of an exemplary display device 200 according to an embodiment of the present disclosure. As shown in FIG. 2, the display device 200 includes a first processor 202, a second processor 204, and a display module 206. The display module 206 may include a display panel 2064 and a backlight module 2062. In some embodiments, the display device 200 may also include a power supply 210 for providing a supply voltage for the first processor 202 and the second processor 204, and a processor board 208 providing peripheral circuitry for the first processor 202.

In some embodiments, the first processor 202 may be an FPGA and may include an inter-integrated circuit (IIC, also I2C) protocol interface 2022, a register (REG) control module 2024, a write external memory control module (Config) 2026, a V-by-One (VBO) transmission module 2028, and a backlight control module 2030.

In some embodiments, the processor board 208 may be an FPGA board card, and may include a serial digital interface (SDI) 2082 for transmitting video signals (for example, a video signal of a monitor screen), a power control module 2084 both electrically coupled to the power supply 210 and the second processor 204, and a memory 2086 for storing configuration files (for example, MCS (Intel MCS-86 Hexadecimal Object) file) of the first processor 202 and other files.

In some embodiments, the second processor 204 may be an SoC, wherein the second processor 204 is electrically coupled to the first processor 202, and send control instructions and some other information (for example, version information) to the first processor 202 through the I2C protocol interface 2022 of the first processor. Upon receiving the control instruction of the second processor 204, the first processor 202 may utilize the register control module 2024 to read a corresponding configuration file (for example, an MCS file) or other file from the memory 2086 via the write external memory control module 2026. The first processor 202 is configured to form a circuit corresponding to the configuration file in response to running the configuration file, send a display signal to the display panel 2064 via the VBO transmission module 2028 in response to processing the control instruction and send the backlight control signal to the backlight module 2062 by the backlight control module 2030.

Figure 3:
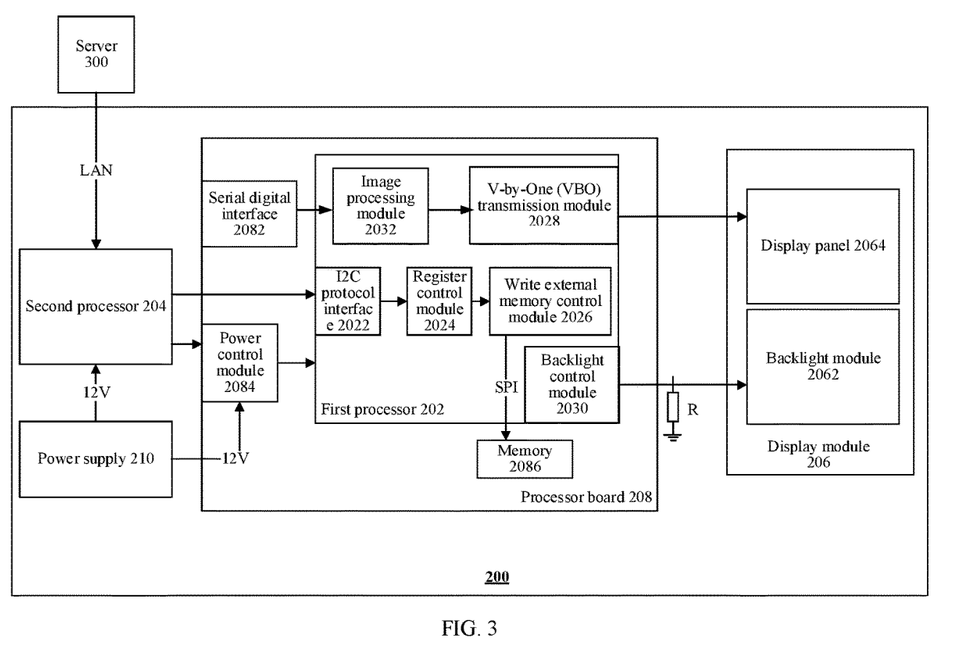
FIG. 3 illustrates a schematic structural diagram of another exemplary display device according to an embodiment of the present disclosure.

FIG. 3 illustrates a schematic structural diagram of another exemplary display device 200 according to an embodiment of the present disclosure. As shown in FIG. 3, in some embodiments, the first processor 202 may further include an image processing module 2032 configured to form a display signal upon processing the video signals received by the serial digital interface 2082 and send a module 2028 to the display panel 2064 by the VBO transmission module 2028.

In some embodiments, the display device 200 may be a monitor, and the video signals received by the serial digital interface 2082 may be video signals captured by a monitor. In some embodiments, the monitor may be a high order display, such as a high definition monitor with a resolution of 4K or an ultra-high definition monitor with a resolution of 8K.

Figure 4:
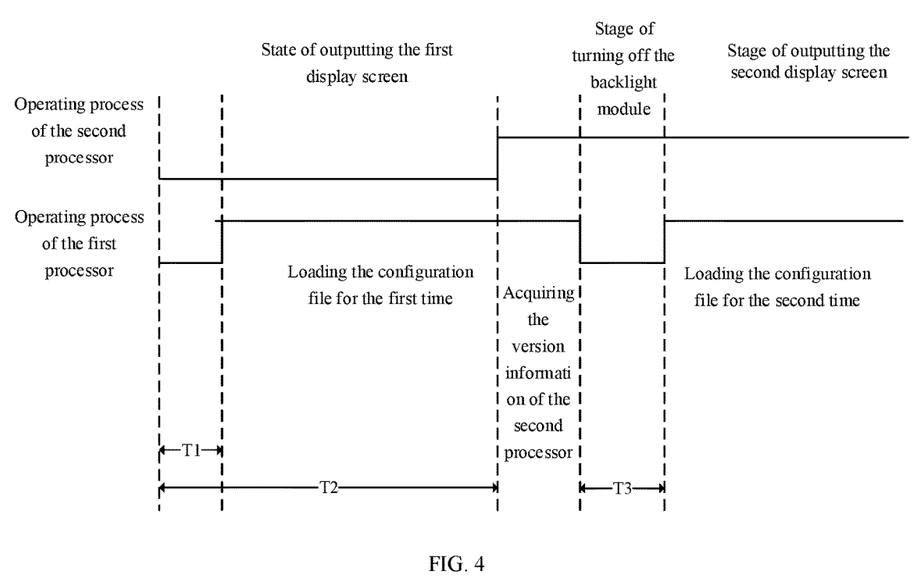
FIG. 4 illustrates a schematic diagram of an exemplary timing graph according to an embodiment of the present disclosure.

FIG. 4 illustrates a schematic diagram of an exemplary timing graph according to an embodiment of the present disclosure.

As shown in FIGS. 2 and 4, when the display device 200 is powered on and initialized, the first processor 202 acquires a startup instruction and completes the startup upon elapse of the first time period T1 based on the startup instruction. Upon completion of startup, the first processor 202 may load a first configuration file associated with the first display screen from the memory 2086 to output a first display screen to the display module, for example, the first display screen may be a boot logo screen.

Figure 5:
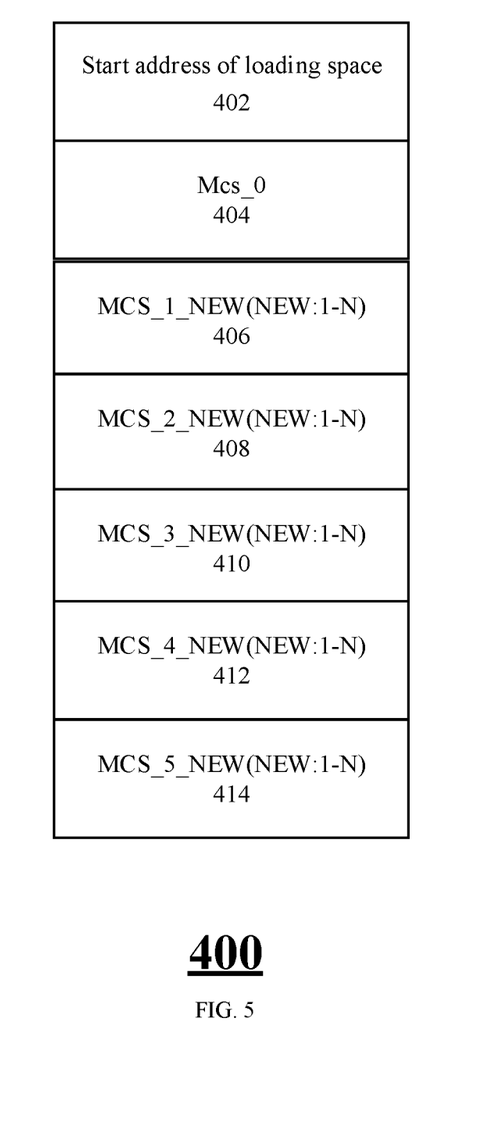
FIG. 5 illustrates a schematic structural diagram of a memory according to an embodiment of the present disclosure.

FIG. 5 illustrates a schematic diagram of a memory structure in a memory according to embodiments of the present disclosure.

As shown in FIG. 5, in some embodiments, the memory 2086 may include a load control module including a start address of loading space 402 to control a jump address of the program; and the memory 2086 also stores configuration files corresponding to different versions of the first processor 202. For example, as shown in FIG. 5, the memory 2086 stores a configuration file 404 (Mcs_0) corresponding to the number zero version, a configuration file 406 (Mcs_1 NEW (NEW: 1-N)) corresponding to a first version, a configuration file 408 (Mcs_2 NEW (NEW: 1-N)) corresponding to a second version, a configuration file 410 (Mcs_3 NEW (NEW: 1-N)) corresponding to a third version, a configuration file 412 (Mcs_4 NEW (NEW: 1-N)) corresponding to a fourth version, and a configuration file 414 (Mcs_5 NEW (NEW: 1-N)) corresponding to a fifth version. When the first processor 202 loads the configuration files in different versions, circuits corresponding the configuration files in the different versions may be acquired by running the configuration files, thereby enabling the corresponding functions.

When the first processor 202 needs to load a configuration file, the start address of loading space 402 may be read, the start address of loading space 402 stores an address of the configuration file to be loaded in the memory 2086, and hence the first processor 202 may acquire the corresponding configuration file from the address.

In some embodiments, in the power-on initialization stage, the start address of loading space 402 stores an address directed to a first configuration file associated with a first display screen (for example, a boot logo screen), and the first processor 202 may acquire the first configuration file (for example, Mcs_0) from the corresponding address by reading the start address of loading space 402 upon the completion of booting of the first processor 202. Upon acquiring the first configuration file, the first configuration file may be run to form a corresponding circuit.

As shown in FIG. 2, the circuit may include an I2C protocol interface 2022, a register control module 2024, a write external memory control module 2026, a VBO transmission module 2028, and a backlight control module 2030. The I2C protocol interface 2022 may be configured to read the version information of the second processor 204, the VBO transmission module 2028 may be configured to output a first display screen (for example, a boot logo) upon the successful first loading, the backlight control module 2030 may be configured to turn on the backlight module 2062, and the write external memory control module 2026 may be configured to modify the jump address in the start address of loading space 402. Thus, upon the successful first loading of the configuration file, the first processor 202 can send a corresponding control signal to the display panel 2064 and the backlight module 2062 to cause the display module 206 to display the first display screen (for example, a boot logo screen). Since the startup time T1 of the first processor 202 is short, the display device 200 may quickly display the first display screen, the user may feel that the booting speed is fast.

Similarly, when the display device 200 is powered on and initialized, the second processor 204 acquires a startup instruction and completes the startup upon elapse of the second time period T2 based on the startup instruction. As can be seen in FIG. 4, the second time period T2 is longer than the first time period T1. That is, the time of completion of startup of the first processor 202 is earlier than the time of completion of startup of the second processor 204. Thus, when the first processor 202 is undergoing the above described operation, as shown in FIG. 4, the second processor 204 is in the startup process.

Upon completion of startup of the second processor 204, the first processor 202 reads the version information, for example, version information of the application (APP), of the second processor from the second processor 204 through the I2C protocol interface 2022 running on the SoC, thereby determining the version information, for example, version information of the firmware of the FPGA, corresponding to the first processor 202, and the first processor 202 modifies the jump address in the start address of loading space 402 based on the version information by the write external memory control module 2026, such that the first processor 202 loads a second configuration file (for example, configuration file 406, 408, 410, 412, or 414) corresponding to the version information when reading the start address of loading space 402 of the memory 2086.

For example, assuming that the application version of the second processor 204 is APP_m_n, the program version of the first processor is the MCS_m_n, the update of the major version relates to addition or deletion of the functions, and thus, when the major version numbers m are made in correspondence, the first processor 202 and the second processor 204 are capable of communicating with each other. Therefore, upon determination of the version information of the first processor 202, the major version numbers m need to be made in correspondence; whereas n is a sub-version number, the sub-version numbers n do not need to be made in correspondence.

In some embodiments, as shown in FIG. 2, the second processor 204 may acquire the updated version of the application from the server 300, acquire the configuration file of the first processor 202 corresponding to the updated version, and send the acquired version and configuration file to the first processor 202 for storage. The second processor 204 and the server 300 are capable of communicating with each other over a local area network (LAN).

In some embodiments, as shown in FIG. 5, in each version update, the memory 2086 may store the new configuration files in such a manner that configuration files in a new version are stored without replacing the configuration files in an earlier version. As such, when the second processor 204 has the version rollback, the first processor 202 can also retrieve the configuration file corresponding to the old version from the memory 2086, thereby resolving the problem that the versions are not in correspondence, which is caused by the version rollback.

The second processor 204 may also send a second configuration file load instruction to the first processor 202 upon completion of startup, such that the first processor 202 loads the configuration file a second time.

Upon receiving the second configuration file load instruction, the first processor 202 again reads the start address of loading space 402. At this time, the start address of loading space 402 has modified the jump address by the version corresponding process, such that in response to reading the start address of loading space 402 once more, the first processor 202 loads a second configuration file corresponding to the version information of the first processor 202 to output a second display screen to the display module 206. In this case, the display device 200 achieves normal display, for example, displaying a monitor picture of the monitor received by the serial digital interface 2082, or displaying an on-screen display (OSD) screen sent by the second processor 204.

In some embodiments, upon completion of loading the second configuration file by the first processor 202, the start address of loading space 402 may also be modified to a jump address corresponding to the first configuration file, such that the display device 200 quickly loads the first display screen upon next power-up initialization.

During the reloading process of the configuration file (second configuration file) by the first processor 202, the first processor 202 fails to be able to perform a VBO protocol handshake with the display panel 2064 by the VBO transmitting module 2028, thereby causing the VBO to be in an out-of-lock state and causing the corresponding pin of the VBO transmission module 2028 to be in a high resistance state. At this time, the display panel 2064 is considered to be without display signal coming inside, thus the display panel 2064 can enter a built-in self-test (BIST) mode, thereby inputting a screen according to the internal storage mechanism of the display panel 2064, which is not the first display screen or the second display screen, but instead belongs to the abnormal screen.

To solve this problem, the first processor 202 controls the backlight module 2062 to be in the off-state in response to receiving the version information of the second processor 202 and prior to receiving the load instruction of the second configuration file of the second processor (the third time period T3 of FIG. 4). Thus, by turning off the backlight, the abnormal screen is prevented from being displayed.

In some embodiments, as shown in FIG. 2, the turning on or off of the backlight module 2062 can be achieved by adding a pull-down resistor R on the hardware circuit to ensure that the backlight module 2062 is in an off-state for a third period of time T3.

It should be noted that the aforementioned embodiments are illustrated with the first processor including an FPGA which is the only one processor, in other embodiments two processors are included which are a micro controller unit (MCU) and an FPGA, wherein the MCU is configured to acquire the version information of the second processor upon completion of booting by the second processor and determine the version information of the corresponding first processor based on the version information of the second processor; and the FPGA is configured to load a second configuration file corresponding to the version information of the first processor to output the second display screen to the display module.

Embodiments of the present disclosure provide a display device. Since the startup time of second processor is longer, the configuration file is loaded twice by the first processor with a shorter startup time. In the first loading, the first processor loads the configuration file, displays the first display screen, and acquires the version information of the second processor upon completion of startup of the second processor. In the second loading, the first processor loads the configuration file of the first processor that corresponds to the version information and displays the second display screen. In this way, since the time from starting the device to displaying the first display screen is shorter, an impression that the screen startup time is shortened is given to the user, and the user experience is improved. Meanwhile, during the second loading, the first processor ensures the version consistency with the second processor, and ensures the version correspondence between the first processor and the second processor. In addition, through the control of the backlight, the problem of abnormal display caused by the out-of-lock of the VBO during the loading of the configuration file by the first processor is avoided.

Figure 6:
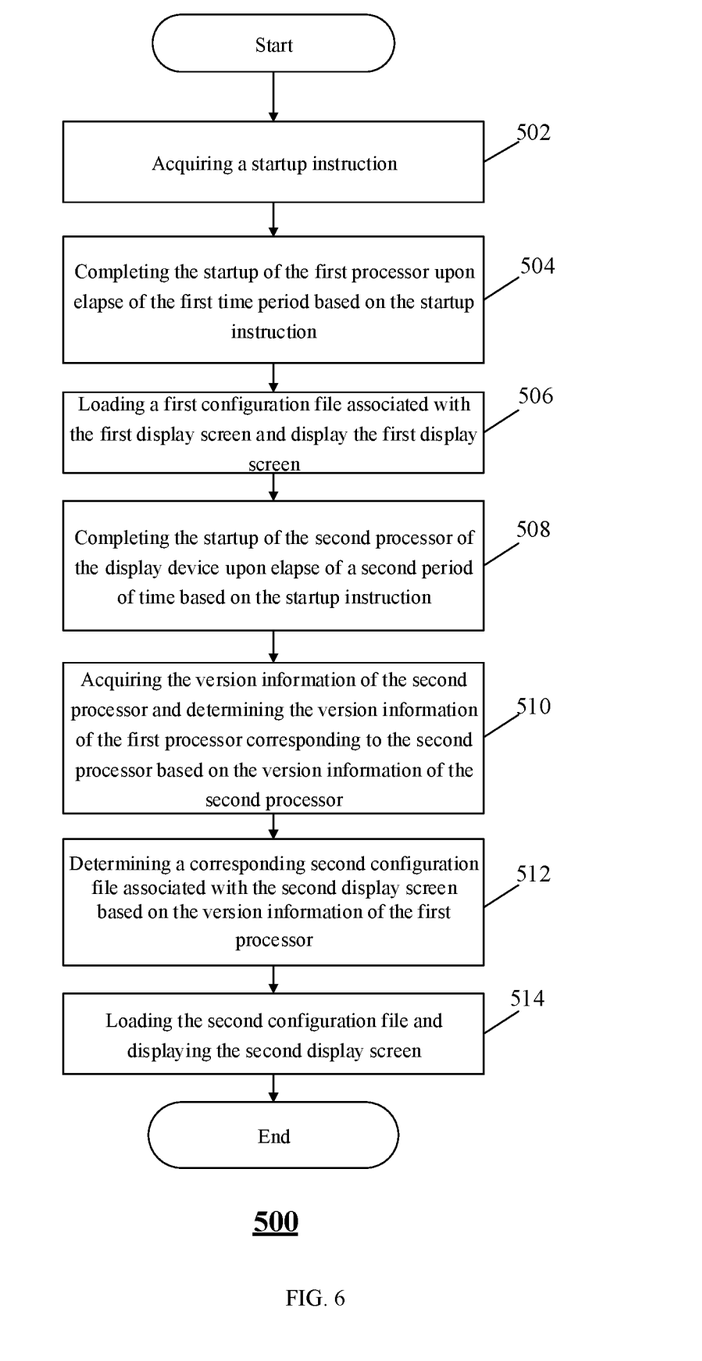
FIG. 6 is a flowchart of an exemplary display method according to an embodiment of the present disclosure.

FIG. 6 is a flowchart of an exemplary display method according to embodiments of the present disclosure. The method 500 may be performed by the display device 200. In some embodiments, the display device 200 may be a monitor. In some embodiments, the resolution of the monitor may be 4K or 8K. The method 500 may include the following processes.

In 502, the display device 200 acquires a startup instruction.

The startup instruction is, for example, a startup instruction triggered by the power button, or the like. Upon receiving the startup instruction, the display device 200 is powered on.

In 504, the display device 200 completes the startup of the first processor upon elapse of the first time period based on the startup instruction.

In 506, the display device 200 loads a first configuration file associated with the first display screen and display the first display screen. In some embodiments, the first display screen can be a boot logo screen.

In some embodiments, loading the first configuration file associated with the first display screen may include: reading a start address of loading space in the memory of the display device to acquire a first configuration file; wherein the start address of loading space is directed to the first configuration file.

Herein, the display device loads the first configuration file through the first processor to display the first display screen by display module.

In 508, the display device 200 completes the startup of the second processor of the display device upon elapse of a second period of time based on the startup instruction, the second time period being longer than the first time period.

That is, the time of completion of startup of the first processor is earlier than the time of completion of startup of the second processor.

In 510, the display device 200 acquires the version information of the second processor and determine the version information of the first processor corresponding to the second processor based on the version information of the second processor.

Herein, the display device performs process 510 by the first processor. In some embodiments, the first processor includes an FPGA, and process 510 is performed by the FPGA. In other examples, the first processor includes an MCU and an FPGA, and process 510 is performed by the MCU.

In 512, the display device 200 determines a corresponding second configuration file associated with the second display screen based on the version information of the first processor.

In some embodiments, determining the second configuration file associated with the second display screen based on the version information of the first processor can include modifying the start address of loading space based on version information of the first processor, wherein the modified start address of loading space is directed to a second configuration file corresponding to the version information of the first processor.

Herein, the display device performs process 512 by the first processor. In some examples, the first processor includes an FPGA, and process 512 is performed by the FPGA. In other examples, the first processor includes an MCU and an FPGA, and process 512 is performed by the MCU.

In 514, the display device 200 loads the second configuration file and display the second display screen. In some embodiments, the second display screen is a monitor screen or an OSD screen.

In some embodiments, loading the second configuration file includes: loading the second configuration file based on the modified start address of loading space.

Herein, the display device loads the second configuration file through the first processor. In some examples, the first processor includes an FPGA, and process 512 is performed by the FPGA. In other examples, the first processor includes an MCU and an FPGA, and process 512 is performed by the MCU.

In some embodiments, the method 500 further includes controlling the backlight module of the display device to be in an off-state in response to acquiring the version information of the second processor and prior to receiving the loading of the second configuration file.

It should be understood that the method may be performed by any device, platform, or cluster of devices having computing and processing capability.

It should be noted that the methods of the present disclosure can be performed by a single device, such as a computer, a server, or the like. The methods of these embodiments can also be applied in a distributed scenario, and complete with multiple devices cooperating. In this distributed scenario, one of the plurality of devices can perform only one or more methods of the present disclosure, the plurality of devices interacting with each other to complete the method.

It should be noted that the foregoing description of specific embodiments of the present disclosure has been described. Other embodiments are within the scope of the following claims. In some cases, the actions or processes recited in the claims may be performed in an order different from that in the embodiments and still achieve desirable results. In addition, the processes depicted in the accompanying figures do not necessarily require the particular order shown, or sequential order, to achieve desirable results. In certain implementations, multitasking and parallel processing can be or may be advantageous.

It should be understood by those of ordinary skill in the art that the above discussion of any of the embodiments above is exemplary only and is not intended to suggest that the scope of the present disclosure (including the claims), is limited to these examples; within the spirit of the present disclosure, the above embodiments or technical features in different embodiments may also be combined, the processes may be performed in any order, and many other variations of the various aspects of the present disclosure as described above are not provided in details for brevity.

Additionally, for simplicity of illustration and discussion, and so as not to obscure the present disclosure, well-known power/ground connections to integrated circuit (IC) chips and other components may or may not be shown in the drawings provided. Further, devices can be shown in block diagram form in order to avoid obscuring the present disclosure, and this also takes into account the fact that the details about the implementation of these block diagram devices are highly dependent on the platform on which the present disclosure will be implemented (that is, these details should be fully within the understanding of those skilled in the art). In the case where specific details (for example, circuits) are described to describe exemplary embodiments of the present disclosure, it is obvious to those skilled in the art that it may be possible to implement the present disclosure without these specific details or when these specific details are changed. Therefore, these descriptions should be considered illustrative rather than restrictive.

While the present disclosure has been described combined with specific embodiments thereof, many alternatives, modifications, and variations of these embodiments will be apparent to those of ordinary skill in the art in light of the foregoing description. For example, other memory architectures, for example, a dynamic RAM (DRAM), can use the discussed embodiments.

The present disclosure is intended to embrace all such alternatives, modifications and variations that fall within the broad scope of the appended claims. Thus, any omissions, modifications, equivalents, improvements, and the like, which can be made within the spirit and principles of the present disclosure, should be embraced within the protection scope of this disclosure.

What is claimed is:

1. A display device, comprising a first processor, a second processor, and a display module; wherein
the first processor is electrically coupled to both the second processor and the display module;
the first processor is configured to:
acquire version information of the second processor upon completion of startup of the second processor,
determine version information of the first processor based on the version information of the second processor, and load a second configuration file corresponding to the version information of the first processor to output a second display screen associated with the second configuration file to the display module; and
the display module is configured to display the second display screen.

2. The device according to claim 1, further comprising: a memory comprising a start address of loading space; wherein
the memory is configured to store configuration files respectively corresponding to different versions of the first processor; and
the first processor is configured to:
modify the start address of loading space based on the version information of the first processor, wherein the modified start address of loading space is directed to the second configuration file, and
load the second configuration file based on the modified start address of loading space in response to receiving a load instruction of the second configuration file of the second processor.

3. The device according to claim 2, wherein
the display module comprises a backlight module; and
the first processor is further configured to control the backlight module to be in an off state in response to acquiring the version information of the second processor and prior to receiving the load instruction of the configuration file of the second processor.

4. The device according to claim 1, wherein
the first processor is further configured to load a first configuration file to output a first display screen associated with the first configuration file to the display module upon completion of startup of the first processor; and
the display module is further configured to display the first display screen;
wherein the time of completion of startup of the first processor is earlier than the time of completion of startup of the second processor.

5. The device according to claim 4, further comprising: a memory comprising a start address of loading space; wherein
the memory is configured to store the configuration files respectively corresponding to different versions of the first processor; and
the first processor is configured to read the start address of loading space to load the first configuration file, wherein the start address of loading space is directed to the first configuration file.

6. The device according to claim 1, wherein the first processor comprises a field-programmable gate array (FPGA), and the second processor comprises a system-on-chip (SoC).

7. The device according to claim 1, wherein
the first processor comprises a microcontroller unit (MCU) and a field-programmable gate array (FPGA); wherein the MCU unit is configured to acquire the version information of the second processor and determine the version information of the first processor corresponding to the second processor based on the version information of the second processor upon completion of startup of the second processor, and the FPGA is configured to load the second configuration file corresponding to the version information of the first processor to output the second display screen to the display module; and
the second processor comprises a system-on-chip (SoC).

8. The device according to claim 1, wherein the display module is a monitor.

9. The device according to claim 8, wherein a resolution of the monitor is 4K or 8K.

10. The device according to claim 4, wherein the first display screen is a boot logo screen, and the second display screen is a monitor screen or an on-screen display (OSD) screen.

11. A display method for a display device, wherein
the display device comprises a first processor, a second processor, and a display module, the first processor being both electrically coupled to the second processor and the display module; and
the method comprises:
acquiring version information of the second processor by the first processor upon completion of startup of the second processor,
determining version information of the first processor corresponding to the second processor based on the version information of the second processor by the first processor, and
loading a second configuration file corresponding to the version information of the first processor to display a second display screen associated with the second configuration file by the display module.

12. The method according to claim 11, wherein
the display device further comprises a memory comprising a start address of loading space and configured to store configuration files respectively corresponding to different versions of the first processor;
the method further comprises: modifying the start address of loading space based on the version information of the first processor, wherein the modified start address of loading space is directed to the second configuration file; and
loading the second configuration file corresponding to the version information of the first processor comprises:
loading the second configuration file based on the modified start address of loading space in response to receiving the load instruction of the second configuration file of the second processor.

13. The method according to claim 12, further comprising:
controlling the backlight module of the display device to be in an off state by the first processor in response to acquiring the version information of the second processor and prior to receiving the loading of the second configuration file by the first processor.

14. The method according to claim 11, further comprising:
loading a first configuration file by the first processor to output a first display screen associated with the first configuration file to the display module upon completion of startup of the first processor;
wherein the time of completion of startup of the first processor is earlier than the time of completion of startup of the second processor.

15. The method according to claim 14, wherein
the display device further comprises a memory comprising a start address of loading space and configured to store the configuration files respectively corresponding to different versions of the first processor; and
loading the first configuration file by the first processor upon completion of startup of the first processor comprises:
reading the start address of loading space to load the first configuration file upon completion of startup of the first processor, wherein the start address of loading space is directed to the first configuration file.

16. The method according to claim 11, wherein the first processor comprises a field-programmable gate array (FPGA), and the second processor comprises a system-on-chip (SoC).

17. The method according to claim 11, wherein the first processor comprises a microcontroller unit (MCU) and a field-programmable gate array (FPGA) and the second processor comprises a system-on-chip (SoC).

18. The method according to claim 11, wherein the display device is a monitor.

19. The method according to claim 18, wherein a resolution of the monitor is 4K or 8K.

20. The method according to claim 14, wherein the first display screen is a boot logo screen, and the second display screen is a monitor screen or an on-screen display (OSD) screen.

* * * * *